United States Patent Office 2,780,559
Patented Feb. 5, 1957

2,780,559

BRUSHING POLYCHROME FINISHES

Vincent L. Sahli, Bay Village, Ohio, assignor to The Sherwin-Williams Company, Cleveland, Ohio, a corporation of Ohio No Drawing. Application February 8, 1954,
Serial No. 409,000

15 Claims. (Cl. 117—10)

This invention relates as indicated to polychrome finishes, and more particularly to coating compositions having different depths of color or tone when viewed at different angles relative to incident light.

While decorative coatings demonstrating a polychrome or opalescent effect upon viewing from different angles relative to incident light have been known heretofore, with those based upon the use of aluminum pigment in minor amount through which to achieve the effect, difficulty in stability of the composition and in application of the composition has been experienced. A primary problem with aluminum pigment-containing finishes is that upon brushing, there seems to be an orientation of the pigment into lines of different depth of color, thereby producing a streaked appearance in the coated surface.

It is a primary object of this invention, therefore, to produce a coating composition which when applied as a film to a surface to be decorated will appear to have different colors or depth of color when viewed at different angles relative to incident light. Another object of this invention is to produce such a coating composition containing leaf-free aluminum.

Another object of this invention is to produce such a coating composition in which the aluminum flake does not orient into lines of different colors on application by means of a brush, paint roller, or sponge, i. e., the typical black streaks associated with most de-leafed aluminum pigmented coating compositions. Thus previous alumium paints have had to be applied by spray methods.

Still another object of this invention is to provide coating compositions of a variety of colors embodying the foregoing features.

Still another object of this invention is to provide a stable, substantially non-settling aluminum pigmented coating composition.

Other objects of this invention will appear as the description proceeds.

To the accomplishment of the foregoing and related ends, said invention, then, consists of the means hereinafter fully described and particularly pointed out in the appended claims, the following description setting forth in detail certain illustrative embodiments of the invention, such disclosed means constituting, however, but a few of the various forms in which the principle of this invention may be employed.

Broadly stated, this invention is in the provision of a polychrome aluminum pigment-containing coating composition comprising an organic film-forming binder having dispersed therein from about 0.075 to about 0.3% by weight of the entire composition of a non-drying alkyl silicone polymer having a viscosity of from about 10 to about 120,000 centistokes, and from about 5.5% to about 13.5% by weight of the entire composition of a non-leafing aluminum pigment having a particle size no greater than about 100 mesh. In the more preferred embodiments of this invention, the coating compositions contemplated herein may be described as polychrome aluminum pigment-containing coating compositions comprising an organic film-forming binder having dispersed therein from about 0.075 to about 0.3% by weight of the entire composition of a non-drying alkyl silicone polymer having a viscosity of from about 10 to about 120,000 centistokes, from about 5.5% to about 13.5% by weight of the entire composition of a non-leafing aluminum pigment having a particle size no greater than about 100 mesh, and a hydrophobic, siliceous flatting agent having a particle size of from 50 to 200 millimicrons, said flatting agent being present in an amount such that the weight ratio of aluminum to said flatting agent is within the range of from 1:0.15 to 1:0.5. Although the flatting agent component as above described is not an essential ingredient of the compositions of this invention, such as, where a glossy finish may be desired, nevertheless, if a dull finish or a finish having less gloss than that normally contributed by the organic film-forming binder is desired, then the flatting agent must be employed within the weight ratios above specified. If such weight ratios are exceeded, it has been found that no deep tone of color will be apparent, and that this condition becomes progressively worse as the upper limit of the ratio is progressively exceeded.

With respect to the organic film-forming binder, any organic film-forming binder which is stable in the system may be employed. Thus, oleoresinous organic binders, oil-modified alkyd resin binders, lacquer binders such as nitrocellulose, and the like, such as are well known to the art may be employed. Thus, drying oils such as linseed oil, dehydrated castor oil, oiticica oil, tung oil, and the like may be employed as an oleoresinous binder portion. Examples of alkyds which may be employed as the organic binder include particularly the drying oil and semi-drying oil modified glyceryl phthalate resins, the glycerine treated maleic modified drying oils, and the like. Lacquer binders which dry by the evaporation of solvent or by chemical condensation of the constituents thereof such as nitrocellulose, polymethylmethacrylate, butylated melamine-formaldehyde, and the like may also be employed. It should also be pointed out that in many cases depending upon the characteristics of the final film which are sought to be achieved, mixtures of the foregoing major classes of organic film-forming binders may be employed. The subsequent specific examples of compositions in accordance with this invention will serve to illustrate the use of certain of the types of resins above mentioned.

It will, of course, be understood that ordinary driers, anti-oxidants, solvents, etc. normally included in coating composition formulations may also be included in the compositions of this invention.

An essential component of the compositions of this invention is a non-drying, alkyl silicone polymer which has a viscosity of from 10 to 120,000 centistokes as a broad range and for most purposes a viscosity within the range of from 300 to 500 centistokes. The materials useful as the silicone components of these inventions are non-volatile liquid products resulting from the hydrolysis of dialkyl dichlorosilanes, particularly dimethyl dichlorosilane. These are normally colorless polymeric oils. In order to stabilize the properties of the polymers, it is frequently necessary to substitute non-reactive end groups for the hydroxyl groups normally terminating the hydrolysis products. One method of accomplishing this is by cohydrolysis of a mixture of trimethyl chlorosilane and dimethyl dichlorosilane. The resulting product is a mixture of hexamethyl disiloxane and cyclic dimethyl siloxanes and include certain intercondensation products such as those having the formula $$(CH_3)_3SiO((CH_3)_2SiO)_xSi(CH_3)_3$$

Depending upon the proportions of dialkyl dichlorosilane and the chain terminating material such as trimethyl chlorosilane, chains of various length and of course various viscosities can be built up. A preferred silicone oil for use in accordance herewith is a co-hydrolysis product of trimethyl chlorosilane and dimethyl dichlorosilane having a viscosity of from 300 to 500 centistokes. The alkoxy end blocked silane hydrolysis product such as disclosed in U. S. Patent 2,415,389 may also be used. Reference may also be had to the book "Chemistry of the Silicones" by Eugene G. Rochow, 2nd edition, 1951.

With respect to the aluminum flake which is used in accordance with the present invention, it is essential that this material be of the non-leafing type. Non-leafing aluminum pigments are normally obtained by treating a leafing aluminum powder with a lead naphthenate solution in the presence of xylol and alcohol. Full details for the production of non-leafing aluminum paste will be found in Patent 2,309,377 dated January 26, 1943 to Gordon M. Babcock. Other methods of de-leafing the aluminum may be employed. The amount of the non-leafing aluminum pigment which is used for the purposes of this invention is greatly in excess of the amount of leafing aluminum pigment normally employed in current polychrome finishes. In the present invention, from 0.48 to 1.17 lbs. of aluminum pigment per gallon of coating composition are used. In the currently available polychrome finishes, the amount of aluminum pigment employed is from 0.02 to 0.07 lbs. of aluminum per gallon. These are generally applied by spray.

Another useful but not essential component of the compositions of this invention is a flatting agent. These are normally siliceous materials such as resulting from the neutralization of an alkali metal silicate with an acid, and the product resulting from the alcohol dehydration of a neutralized alkali metal silicate. These alkali metal silicate products are hydrophilic in nature and preferably have a particle size ranging from 0.5 to 2 microns. Another material which may be used is de-alkalized alkali metal silicate by a cation exchange method, the resulting product which has been treated with an organo hydrophobic agent and then dried. These de-alkalized alkali metal silicate products are hydrophobic in nature and preferably have a particle size ranging from 50 to 200 millimicrons. Diatomaceous silica may also be employed for this purpose. Finely divided dehydrated silica gels produced by various de-alkalizing procedures known to the art are preferred.

Another material which has proved useful in this composition is the alkyl ether of hydroxy ethyl cellulose, a resinous material soluble in aliphatic petroleum solvents. It contributes a degree of thixotropy desirable in controlling flow characteristics without causing the severe brush marking normally obtained from thixotropic coatings.

It should be noted that when a flatting agent is employed, the weight ratio of aluminum to flatting agent is of a critical nature. The amount of flatting agent employed must be within the range of from 15 to 50 parts per 100 parts of aluminum powder. Amounts less than indicated do not give a gloss reduction of any substantial degree, and amounts in excess of that indicated result in there being no deep tone of color on viewing from different angles relative to the light incident upon the surface sought to be decorated. The deep tonal quality becomes progressively worse as this upper limit is exceeded.

It becomes convenient at this point to illustrate the mode of formulating the compositions of this invention by giving specific examples which are intended for illustrative purposes only. The scope of the invention is not to be construed as limited to the precise scope of the examples reproduced below.

EXAMPLE I

A. *Leaf-free aluminum base:* Parts
300 mesh leaf-free aluminum paste 73.5% metal _____ 44.2
Mineral spirits _____ 31.4
Polymethyl silicone 500 cstks. vis_____ 0.4
Zinc resinate solution 5.8% Zn on resin basis, 64% solids _____ 8.0
Agitate for about 1 hour or until homogeneous, then add—
Alkyd resin, soya modified pentaerythritol phthalate 70% solids _____ 16.0
_____
100.0

B. *Flatting base:* Parts
Alcohol dehydrated silica aerogel_____ 15.0
Mineral spirits _____ 26.0
Alkyd resin, soya modified pentaerythritol phthalate 70% solids _____ 59.0
_____
100.0

All ingredients in B are charged in a pebble mill and rolled for 12–20 hours or until a suitable fine dispersion is obtained. A dispersion rated between 6 and 7 on the Hegman grind gauge is desirable.

C. *Color base—phthalocyanine blue:* Parts
Copper phthalocyanine blue pigment _____ 20.0
Mineral spirits _____ 20.0
Alkyd resin, soya modified pentaerythritol phthalate 70% solids _____ 60.0
_____
100.0

D. *Coating composition:* Parts
Aluminum base A _____ 360.0
Flatting base B _____ 150.0
Color base C _____ 90.0
Alkyd resin _____ 224.0
10% lead naphthenate solution _____ 11.0
2% manganese naphthenate solution _____ 7.0
2% cobalt naphthenate solution _____ 7.0
17% methyl ethyl ketoxime in mineral spirits solution _____ 10.0
_____
859.0

This composition may be applied by brushing or hand roller coated and when dry will yield a satin-like film that changes in color from a very light blue to a very deep blue when viewed at different angles relative to incident light. There will be no tendency for the aluminum flakes to flocculate and leave dark areas or streaks in the film as does conventional polychrome finishes when applied in the above manner. This composition is particularly adapted to the finishing of interior walls.

EXAMPLE II

A. *Aluminum base:* Parts
300 mesh leaf-free aluminum paste 73.5% metal _____ 44.2
Mineral spirits _____ 31.8
Zinc resinate solution, 5.8% zinc on resin base 64% solids _____ 8.0
Agitate the above ingredients for about 1 hour or until homogeneous and then add:
Alkyd resin, soya oil modified pentaerythritol phthalate 70% solids _____ 16.0
_____
100.0

The above base is identical to the aluminum base A in Example I above except that the polymethyl silicone has been omitted and replaced by additional mineral spirits.

B. *Coating composition:*

The composition is identical to Examples I-D except that the aluminum base A in this example has been substituted for the aluminum base A of Example I to eliminate the polymethyl silicone in order to illustrate the beneficial effects of this ingredient.

This composition when applied as Example I shows considerable black streaks when applied by brush, and a greatly flocculated condition when applied by hand roller coater. The general appearance is undesirable as a decorative finish.

EXAMPLE III

A. *Aluminum base:* Parts
300 mesh leaf-free aluminum paste 73.5% metal, 26.5% mineral spirits _____ 44.2
Mineral spirits _____ 31.6
Polymethyl silicon 500 cstks. viscosity_____ 0.2
Zinc resinate solution 5.8% zinc based on resin, 64% solids _____ 8.0
Alkyd resin, soya modified pentaerythritol phthalate _____ 16.0

100.0

The compounding technique and the composition of this base is the same as in Example I-A except that the polymethyl silicon content is reduced by half.

This aluminum base was substituted in the coating composition shown in Example I-D for the base described in I-A. When applied the results obtained were not significantly different than obtained with the Example I-D composition.

EXAMPLE IV

Parts
Example III-A aluminum base_____ 180
Example I-B flatting base_____ 357
Example I-C color base_____ 45
Alkyd resin, soya modified pentaerythritol phthalate 70% solids_____ 227
10% lead naphthenate solution_____ 11
2% manganese naphthenate solution in mineral spirits _____ 7
2% cobalt naphthenate solution in mineral spirits__ 7
17% methyl ethyl ketoxime solution in mineral spirits _____ 10

844

The effect of the composition in Example IV is to reduce both the aluminum content and the silicone oil concentration. When applied as described in Example I, black streaks and flocculated areas were prevalent although were not as obvious as shown by Example II.

EXAMPLE V

The composition of Example V is identical to that in Example IV except that the aluminum base of Example I-A was used in order to increase the silicone concentration equal to that used in Example III. Half as much aluminum base containing twice the silicone oil content was used.

When applied as Example I the black streaks and flocculated areas were eliminated. The necessity for adjusting the concentration of silicone oil based on the entire coating composition rather than on the metal content is thereby established.

EXAMPLE VI

A. *Aluminum base:* Parts
400 mesh leaf free aluminum paste, 65% metal 35% mineral spirits_____ 50.0
Mineral spirits _____ 25.8
Polymethyl silicone _____ 0.2
Zinc resinate solution_____ 8.0
Alkyd resin_____ 16.0

100.0

B. *Coating composition:*

The composition used in this example is identical to that of Example III except that the finer aluminum base above was substituted. The results obtained were comparable to those obtained with Example III. The color, however, was less deep and more gray in tone due to the greater tinting strength of the fine aluminum particles.

EXAMPLE VII

A. *Aluminum base:* Parts
100 mesh leaf-free aluminum paste 65% metal, 35% mineral spirits_____ 50.0
Mineral spirits _____ 25.8
Polymethyl silicone 500 cstks. vis_____ 0.2
Zinc resinate solution_____ 8.0
Alkyd resin_____ 16.0

100.0

This aluminum base was substituted in the composition of Example III and the results obtained were similar except for the color which was much less gray and more brilliant due to the lower tinting strength of the coarser metallic flakes.

EXAMPLE VIII

A. *Aluminum base:* Parts
400 mesh leaf-free aluminum paste, 65% metal, 35% mineral spirits_____ 50.0
Mineral spirits _____ 16.0
Polymethyl silicone _____ 0.2
Raw linseed oil_____ 33.8

100.0

B. *Flatting base:* Parts
325 natural marine diatomaceous silica_____ 40.0
Raw linseed oil_____ 60.0

100.0

The above ingredients are dispersed to a 5-6 fineness on the Hegman gauge by any conventional means.

C. *Color base—phthalocyanine blue:* Parts
Copper phthalocyanine blue_____ 20.0
Heat bodied linseed oil, 50″ vis. Gardner-Holdt tube _____ 20.0
Raw linseed oil_____ 60.0

100.0

The above is dispersed to a 7 fineness on the Hegman gauge either by flushing the pigment from the water presscake or by dispersing the dried pigment by conventional means.

D. *Paint composition:* Parts
Aluminum base A _____ 360.0
Flatting base B_____ 250.0
Color base C _____ 90.0
Raw linseed oil_____ 130.0
10% lead naphthenate solution in mineral spirits_____ 11.0
2% manganese naphthenate solution in mineral spirits_____ 7.0
2% cobalt naphthenate_____ 7.0

This composition is a durable exterior coating for wood etc., i. e., house paint.

EXAMPLE IX

| | Parts |
|---|---|
| Example I-A aluminum base | 360.0 |
| Alkyd resin, 50% solids comprising a phenol-formaldehyde modified glycerol phthalate resin modified with a mixture of tung oil and linseed oils | 220.0 |
| Example I-C color base | 180.0 |
| Mineral spirits | 50.0 |
| 10% lead naphthenate solution in mineral spirits | 11.0 |
| 2% manganese naphthenate solution in mineral spirits | 7.0 |
| 2% cobalt naphthenate solution in mineral spirits | 7.0 |
| 17% methyl ethyl ketoxime solution in mineral spirits | 10.0 |

This composition is a high gloss durable automotive finish suitable for brush application on automobile bodies, metal furniture, etc. The satin-like texture is not prevalent but the polychrome or opalescent qualities are very apparent.

EXAMPLE X

| | Parts |
|---|---|
| Aluminum base A of Example I | 360.0 |
| Flatting base B of Example I | 150.0 |
| Color base C of Example I | 90.0 |
| 20% solution of the ethyl ether of hydroxy ethyl cellulose dissolved in 80-20 mixture of mineral spirits and isopropanol | 20.0 |
| Alkyd resin | 224.0 |
| 10% lead naphthenate solution | 11.0 |
| 2% manganese naphthenate solution | 7.0 |
| 2% cobalt naphthenate solution | 7.0 |
| 17% methyl ethyl ketoxime solution in mineral spirits | 10.0 |
| | 879.0 |

This composition is identical to the composition of Example I except for the addition of the cellulose derivative which gives a thixotropic consistency desirable in obtaining controlled flow characteristics.

These compositions may be formulated by blending in accordance with the usual practice. It has been found, however, desirable to disperse the aluminum paste in a mixture of solvent, a dispersant such as zinc naphthenate or zinc resinate, and the silicone oil in such a manner that the composition is homogeneous throughout. Where a flatting agent is employed, this material is desirably pre-dispersed to form a flatting base with the organic binder which is then added to the aluminum mixture. Although the vehicle of the flatting base may be different from the vehicle used in the coating composition, the blending of the flatting base with the aluminum composition is facilitated where the vehicles are the same in both cases. Coloring matter is desirably added in pre-dispersed form using vehicles similar to or compatible with the major coating binder. Additional varnishes, driers, anti-oxidants, etc. may be added to form the finished compositions.

One of the surprising features of the compositions of this invention is that contrary to previous experience with normal aluminum-containing compositions, the aluminum pigment in the present compositions does not settle into a hard cake upon standing. Even after several months of standing, the aluminum pigment is still highly dispersed through the liquid and any settling which may have occurred may be remedied by simply shaking the container. No strong agitation is required to re-disperse the aluminum pigment homogeneously throughout the composition, and no firm cake is formed at the bottom of the container.

Unusual decorating effects may be obtained with the compositions of this invention. For example, where the walls of a room are painted by paint roller or brush using paint from the same batch, a different depth of color will be observed on each wall due to the difference in the angle from which each wall is viewed with respect to the incident light.

Another especially decorative effect may be achieved by applying the coatings of this invention over an uneven surface, e. g., a stippled surface. Here again, in various portions, the angle of the film with respect to that of the incident light is different giving rise to apparent variations in depth of color. Effects of this type may be achieved by applying these coatings over a roughened surface, e. g., stucco or stippled surface and allowing them to dry. Alternatively, the coatings of this invention may be applied to a smooth surface, e. g., the usual wall surface whether papered or merely sized plaster board, or the like, and then re-rolled before dry with an irregular surface paint roller, with or without the addition of more paint to create differences in film thickness. At the places where the film thickness changes, the angle of incident light to the angle of the film surface is again varied and the apparent depth of color changes. Patterns may be introduced as by the use of a roller for the re-rolling or stippling step which is provided with a patterned surface.

This application is a continuation-in-part of my co-pending application Ser. No. 324,850 filed December 8, 1952 and now abandoned.

Other modes of applying the principle of this invention may be employed instead of those specifically set forth above, changes being made as regards the details herein disclosed, provided the elements set forth in any of the following claims or the equivalent of such be employed.

I claim:

1. A coating composition comprising an organic film-forming binder having dispersed therein from about 0.075% to about 0.3% by weight of the entire composition of a non-drying alkyl silicone polymer having a viscosity of from about 10 to about 120,000 centistokes, and from about 5.5% to about 13.5% by weight of the entire composition of a non-leafing aluminum pigment having a particle size no greater than about 100 mesh.

2. A coating composition comprising an organic film-forming binder having dispersed therein from about 0.075% to about 0.3% by weight of the entire composition of a non-drying alkyl silicone polymer having viscosity of from about 10 to about 120,000 centistokes, from about 5.5% to about 13.5% by weight of the entire composition of a non-leafing aluminum pigment having a particle size no greater than about 100 mesh, and a siliceous flatting agent having a particle size of from 0.5 to 2 microns, said flatting agent being present in an amount such that the weight ratio of aluminum pigment to said flatting agent is within the range of from 1:0.15 to 1:0.5.

3. A composition in accordance with claim 1 in which the alkyl silicone polymer is a methyl silicone polymer.

4. A composition in accordance with claim 1 in which the alkyl silicone polymer is a methyl silicone polymer having a viscosity of from 300 to 500 centistokes.

5. A composition in accordance with claim 2 in which the siliceous flatting agent is a finely divided silica aerogel.

6. A coating composition comprising an oil-modified alkyd resin as the organic film-forming binder, said resin having dispersed therein from about 0.075% to about 0.3% by weight of the entire composition of a non-drying alkyl silicone polymer having a viscosity of from about 10 to about 120,000 centistokes, and from about 5.5% to about 13.5% by weight of the entire composition of a non-leafing aluminum pigment having a particle size no greater than about 100 mesh.

7. A coating composition comprising a drying oil as an organic film-forming binder having dispersed therein from about 0.075% to about 0.3% by weight of the entire composition of a non-drying alkyl silicone polymer having a viscosity of from about 10 to about 120,000 centistokes, and from about 5.5% to about 13.5% by weight of the entire composition of a non-leafing aluminum pigment having a particle size no greater than about 100 mesh.

8. A coating composition comprising an oil-modified alkyd resin as an organic film-forming binder, said resin having dispersed therein from about 0.075% to about 0.3% by weight of the entire composition of a non-drying methyl silicone polymer having a viscosity of from about 300 to about 500 centistokes, from about 5.5% to about 13.5% by weight of the entire composition of a non-leafing aluminum pigment having a particle size no greater than about 100 mesh, and a hydrophobic siliceous flatting agent having a particle size of from about 0.5 to 2 microns, said flatting agent being present in an amount such that the weight ratio of aluminum pigment to said flatting agent is within the range of from 1:0.15 to 1:0.5.

9. A coating composition comprising a drying oil as an organic film-forming binder, said oil having dispersed therein from about 0.075% to about 0.3% by weight of the entire composition of a non-drying methyl silicone polymer having a viscosity of from about 300 to 500 centistokes, from about 5.5% to about 13.5% by weight of the entire composition of a non-leafing aluminum pigment having a particle size no greater than about 100 mesh, and a siliceous flatting agent having a particle size of from 0.5 to 2 microns, said flatting agent being present in an amount such that the weight ratio of aluminum pigment to said flatting agent is within the range of from 1:0.15 to 1:0.5.

10. A composition in accordance with claim 8 in which the oil-modified alkyd resin is a soya bean oil modified pentaerythritol phthalate resin.

11. A composition in accordance with claim 9 in which the drying oil is linseed oil.

12. A composition in accordance with claim 8 in which the oil-modified alkyd resin is a phenol-formaldehyde modified glycerol phthalate resin modified with a mixture of tung oil and linseed oil.

13. The method of decorating a surface which comprises applying thereto a coating composition comprising an organic film-forming binder having dispersed therein from about 0.075 to about 0.3% by weight of the entire composition of a non-drying alkyl silicone polymer having a viscosity of from about 10 to about 120,000 centistokes, and from about 5.5% to about 13.5% by weight of the entire composition of a non-leafing aluminum pigment having a particle size no greater than about 100 mesh, and allowing the coated surface to dry.

14. The method of decorating a surface which comprises applying thereto a coating composition comprising an organic film-forming binder having dispersed therein from about 0.075% to about 0.3% by weight of the entire composition of a non-drying alkyl silicone polymer having viscosity of from about 10 to about 120,000 centistokes, from about 5.5% to about 13.5% by weight of the entire composition of a non-leafing aluminum pigment having a particle size no greater than about 100 mesh, and a siliceous flatting agent having a particle size of from 0.5 to 2 microns, said flatting agent being present in an amount such that the weight ratio of aluminum pigment to said flatting agent is within the range of from 1:0.15 to 1:0.5 and allowing the coated surface to dry.

15. The method of decorating a surface which comprises applying thereto a coating composition comprising an organic film-forming binder having dispersed therein from about 0.075% to about 0.3% by weight of the entire composition of a non-drying alkyl silicone polymer having a viscosity of from about 10 to about 120,000 centistokes, and from about 5.5% to about 13.5% by weight of the entire composition of a non-leafing aluminum pigment having a particle size no greater than about 100 mesh, re-rolling the thus coated surface before dry with a paint roller having an irregular roller surface, and allowing the surface to dry.

References Cited in the file of this patent

UNITED STATES PATENTS

| | | |
|---|---|---|
| 269,144 | West | Dec. 12, 1882 |
| 2,393,731 | Babcock | Jan. 29, 1946 |
| 2,467,858 | Sage | Apr. 19, 1949 |
| 2,523,065 | Sage | Sept. 19, 1950 |
| 2,541,975 | Bird | Feb. 20, 1951 |
| 2,642,404 | Pike | June 16, 1953 |